United States Patent
Xiong et al.

(10) Patent No.: US 10,101,894 B2
(45) Date of Patent: Oct. 16, 2018

(54) INFORMATION INPUT USER INTERFACE

(71) Applicant: Tencent Technology (Shenzhen) Company Limited, Shenzhen (CN)

(72) Inventors: Qilin Xiong, Shenzhen (CN); Chenglin Zhan, Shenzhen (CN); Jing Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 570 days.

(21) Appl. No.: 14/805,660

(22) Filed: Jul. 22, 2015

(65) Prior Publication Data

US 2015/0324112 A1    Nov. 12, 2015

Related U.S. Application Data

(63) Continuation of application No. PCT/CN2014/080242, filed on Jun. 18, 2014.

(30) Foreign Application Priority Data

Jun. 24, 2013 (CN) .......................... 2013 1 0254264

(51) Int. Cl.
*G06F 3/0484* (2013.01)
*G06F 3/0482* (2013.01)
*G06F 3/0488* (2013.01)

(52) U.S. Cl.
CPC ........ *G06F 3/04847* (2013.01); *G06F 3/0482* (2013.01); *G06F 3/0488* (2013.01)

(58) Field of Classification Search
CPC ... G06F 3/04847; G06F 3/0482; G06F 3/0488
See application file for complete search history.

(56) References Cited

U.S. PATENT DOCUMENTS 7,117,450 B1 * 10/2006 Chaudhri ............ G06F 3/04847
715/787
2002/0118848 A1    8/2002 Karpenstein
(Continued)

FOREIGN PATENT DOCUMENTS

CN         1632734         6/2005

OTHER PUBLICATIONS

First Chinese Office Action dated Oct. 31, 2017.

*Primary Examiner* — Li P Sun
(74) *Attorney, Agent, or Firm* — Anova Law Group, PLLC

(57) ABSTRACT

The present disclosure discloses an information input method, device and electronic apparatus and belongs to the technical field of touch control. The method includes displaying a predetermined sliding track and a slider located on the predetermined sliding track, the predetermined sliding track including at least one candidate stop-node, each candidate stop-node being corresponding to a piece of candidate input information; receiving a control signal corresponding to the slider; causing the slider to change a position on the predetermined sliding track according to the control signal; and, taking the candidate input information corresponding to the candidate stop-node where the slider stays as input information when the changed position of the slider is one of the candidate stop-nodes. The present disclosure solves the problem of relatively low input efficiency in the existing information input method.

15 Claims, 7 Drawing Sheets

(56) References Cited

U.S. PATENT DOCUMENTS

| | | | |
|---|---|---|---|
| 2008/0126989 A1* | 5/2008 | Flores | G06F 3/04855 715/833 |
| 2011/0126148 A1* | 5/2011 | Krishnaraj | G06F 3/016 715/784 |
| 2013/0061180 A1 | 3/2013 | Dongen et al. | |
| 2013/0100042 A1 | 4/2013 | Kincaid | |

\* cited by examiner

INFORMATION INPUT USER INTERFACE

CROSS-REFERENCES TO RELATED APPLICATIONS

This application is a continuation of International Application No. PCT/CN2014/080242, filed on Jun. 18, 2014, which claims priority to Chinese patent application No. 201310254264.5, filed on Jun. 24, 2013, the content of which are incorporated herein by reference in their entirety.

TECHNICAL FIELD

The present disclosure relates to the technical field of touch control, more particularly to an information input method, device and electronic apparatus.

BACKGROUND

Current electronic apparatuses increasingly use touch screens as display and input apparatuses, such as smart phones, e-ink-based e-book reader and tablet computers, etc.

These electronic apparatuses containing touch screens usually have not physical keyboards and mice as peripheral input tools, make greater use of the touch screens to achieve information input, and therefore have higher requirements for the accuracy and convenience at the time of information input. Refer to FIG. 1, which illustrates a schematic diagram of an information input method provided in the background art. The electronic apparatus provides an interactive interface 10 for opening an xx service. The interactive interface 10 contains thereon a drop-down list 12 involving length of time. A user can click on the drop-down list that is initially unexpanded, and then select on the expanded drop-down list 12 a piece of candidate input information 14 involving length of time, thus achieving the input of information of "3 months".

In the process of implementing the present disclosure, the inventor has found that there exist at least the following problems in the background art: in the presence of a plurality of candidate input information 14, the drop-down list 12 will be very long, thus occupying a relatively large display space on the touch screen. Even if the drop-down first 12 is made to conduct a scroll display within a range of a certain size in order to reduce the size of the display space occupied by the drop-down list 12, the user is required to scroll the list so as to be able to view all the candidate input information 14, while in this process, it is required that the process will not be completed until the user has conducted multiple operations, thus the input efficiency being relatively low.

SUMMARY

To solve the problem of relatively low input efficiency in the existing information input method, embodiments of the present disclosure provide an information input method, device and electronic apparatus. The technical solution is as follows.

According to an aspect of the present disclosure, there is provided an information input method, comprising:

displaying a predetermined sliding track and a slider located on the predetermined sliding track, the predetermined sliding track including at least one candidate stop-node, each candidate stop-node being corresponding to a piece of candidate input information;

receiving a control signal corresponding to the slider;

causing the slider to change a position on the predetermined sliding track according to the control signal; and taking the candidate input information corresponding to the candidate stop-node where the slider stays as input information when the changed position of the slider is one of the candidate stop-nodes.

According to another aspect of the present disclosure, there is provided an information input device, comprises:

a track displaying module configured to display a predetermined sliding track and a slider located on the predetermined sliding track, the predetermined sliding track including at least one candidate stop-node, each candidate stop-node being corresponding to a piece of candidate input information;

a signal receiving module configured to receive a control signal corresponding to the slider;

a position changing module configured to cause the slider to change a position on the predetermined sliding track according to the control signal; and a candidate input module configured to, when the changed position of the slider is one of the candidate stop-nodes, take the candidate input information corresponding to the candidate stop-node where the slider stays as input information.

According to still another aspect of the present disclosure, there is provided an electronic apparatus comprising the information input device described in the above other aspect.

The advantageous effects brought about by the technical solution provided by the embodiments of the present disclosure are as follows:

By displaying a predetermined sliding track including at least one candidate stop-node and taking the candidate input information corresponding to the candidate stop-node where the slider stays as input information, the problem of relatively low input efficiency in the existing information input method is solved, and the effect of inputting quickly and easily information using the staying position of the slider only by making the slider slide on the predetermined slider track.

BRIEF DESCRIPTION OF THE DRAWINGS

In order to more clearly describe the technical solution in the embodiments of the present disclosure, the drawings required in the description of the embodiments will be introduced briefly below. Obviously, the drawings in the following description are only some embodiments of the present disclosure, and for those skilled in the art, other drawings can be obtained based on these drawings without creative work.

DETAILED DESCRIPTION

In order to make the object, technical solution and advantages of the present disclosure more clear, the embodiments of the present disclosure will be further detailed below in conjunction with the drawings.

The "electronic apparatus" described in the present text is usually an electronic apparatus including a touch screen. Specifically it can be a smart phone, a tablet PC, an e-book reader, an MP3 player (Moving Picture Experts Group Audio Layer III), an MP4 (Moving Picture Experts Group Audio Layer IV) player, a portable laptop computer and a desktop computer, etc.

Figure 1:
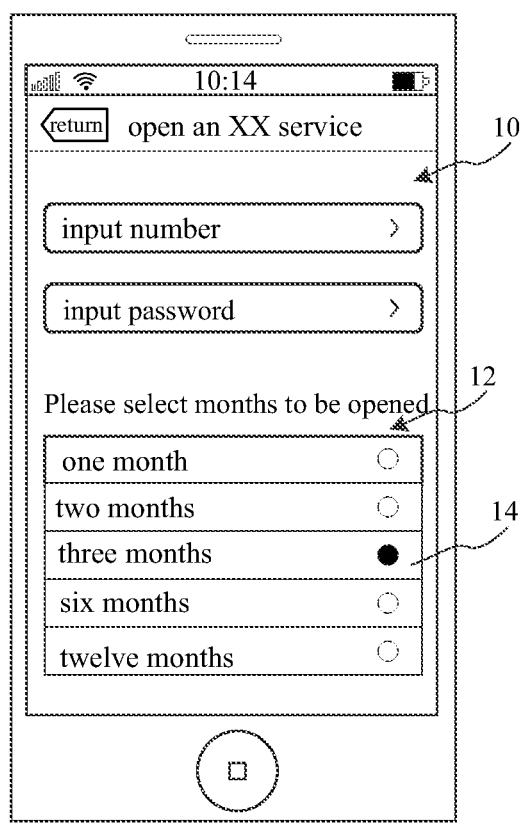
FIG. 1 is an input schematic diagram of an information input method provided in the background art.
Figure 2A:
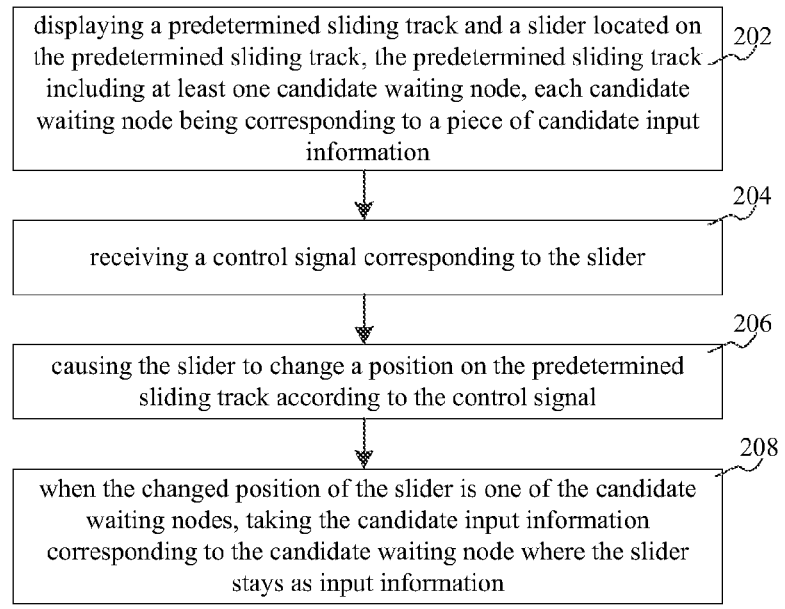
FIG. 2A is a method flow chart of an information input method provided according to an embodiment of the present invention.

Refer to FIG. 2A, which shows a method flow chart of an information input method provided according to an embodiment of the present invention. The information input method may be used in an electronic apparatus, particularly an electronic apparatus comprising a touch screen. The information input method comprises step 202 to step 208.

At step 202, a predetermined sliding track and a slider located on the predetermined sliding track is displayed, the predetermined sliding track includes at least one candidate stop-node, each candidate stop-node corresponds to a piece of candidate input information.

Figure 2B:
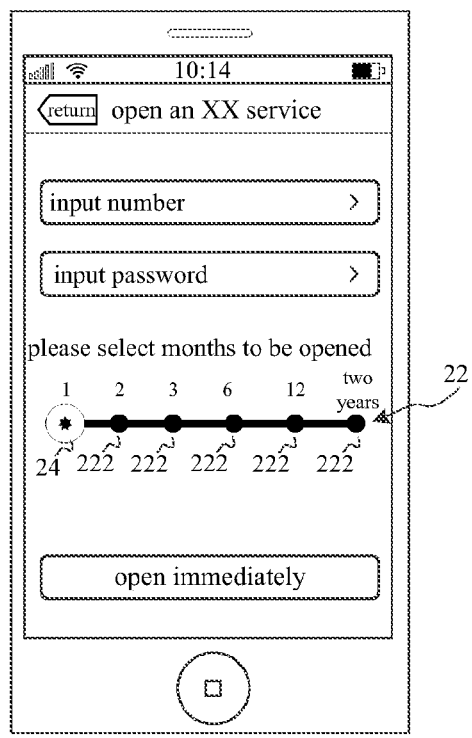
FIG. 2B is an interface schematic diagram involved in the information input method provided by the embodiment shown in FIG. 2A.

Taking that the electronic apparatus is a smart phone as an example, and in conjunction with FIG. 2B, the smart phone can display a predetermined sliding track 22 and a slider 24 located on the predetermined sliding track 22, the predetermined sliding track 22 includes at least one candidate stop-node 222, each candidate stop-node 222 corresponds to a piece of candidate input information. For example, the candidate input information corresponding to the respective candidate stop-nodes are different numerical values which belong to a same measuring dimension and whose probabilities to be input are higher than a predetermined threshold. In the present embodiment, the candidate input information can be the number of months "1", "2", "3", . . . , "12" and "2 years", etc. In other embodiments, the candidate input information can be different according to specific implementation scenes.

At step 204, a control signal corresponding to the slider is received.

At step 206, the slider is caused to change a position on the predetermined sliding track according to the control signal.

At step 208, when the changed position of the slider is one of the candidate stop-nodes, the candidate input information corresponding to the candidate stop-node where the slider stays is regarded as input information.

It is assumed that the changed position of the slider 24 is the third candidate stop-node 222, and then the candidate input information corresponding to the candidate stop-node, i.e., the number of months "3", is taken as the input information.

In summary, by displaying a predetermined sliding track including at least one candidate stop-node and taking the candidate input information corresponding to the candidate stop-node where the slider stays as input information, the information input method provided by the present embodiment solves the problem of relatively low input efficiency in the existing information input method, and achieves the effect of inputting quickly and easily information using the staying position of the slider only by making the slider slide on the predetermined slider track.

The candidate input information can not always meet an input requirement, for example in the example shown in FIG. 2B, the information of "4 months" can not be input, so the present disclosure further provides the following more preferred embodiment. In the preferred embodiment, there are provided simultaneously such two input modes as a candidate input mode and a self-defined input mode to meet the demands under different scenes.

Figure 3A:
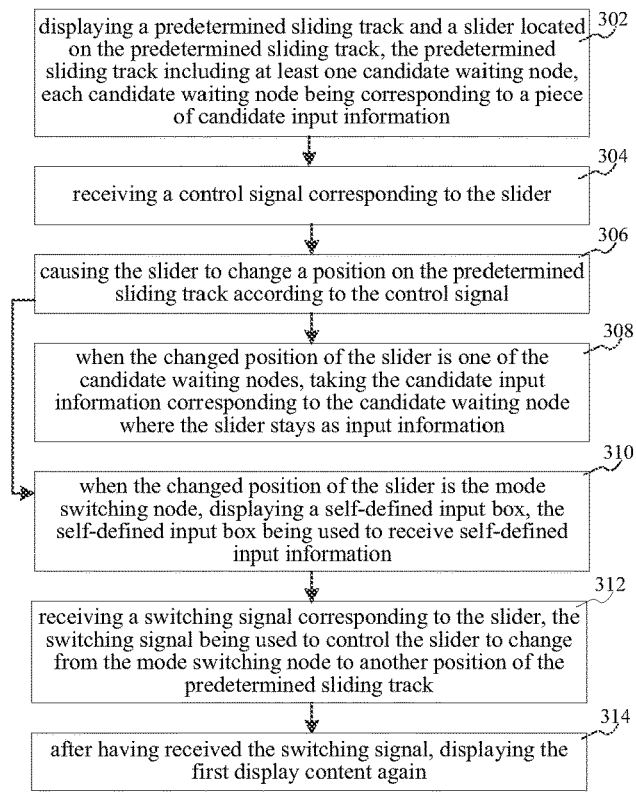
FIG. 3A is a method flow chart of an information input method provided according to another embodiment of the present invention.

Refer to FIG. 3A, which shows a method flow chart of an information input method provided according to another embodiment of the present invention. The embodiment takes that the information input method is applied in an electronic apparatus as an example to illustrate. The electronic apparatus can be a smart phone.

At step 302, a predetermined sliding track and a slider located on the predetermined sliding track is displayed, the predetermined sliding track includes at least one candidate stop-node, each candidate stop-node corresponds to a piece of candidate input information; and the predetermined sliding track further comprises a mode switching node.

The electronic apparatus displays a predetermined sliding track and a slider located on the predetermined sliding track, the predetermined sliding track includes at least one candidate stop-node and a mode switching node, each candidate stop-node corresponds to a piece of candidate input information; the mode switching node is used to trigger switching between a candidate input mode and a self-defined input mode; the candidate input mode is a mode in which the candidate input information corresponding to the candidate stop-node is used to input information; and the self-defined input mode is a mode in which a self-defined input box is used to input information by inputting self-defined information through a tangible keyboard or a virtual keyboard.

Figure 3B:
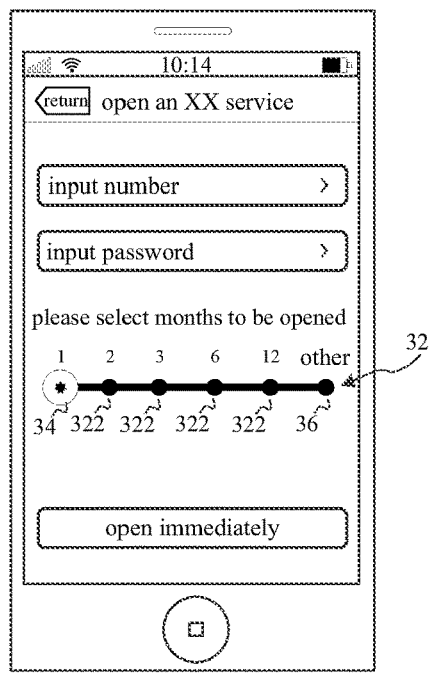
FIG. 3B to FIG. 3G are interface schematic diagrams involved in the information input method provided by the embodiment shown in FIG. 3A.

In conjunction with FIG. 3B, the smart phone can display a predetermined sliding track 32 and a slider 34 located on the predetermined sliding track 32, the predetermined sliding track 32 includes at least one candidate stop-node 322 and a mode switching node 36, each candidate stop-node 322 corresponds to a piece of candidate input information. For example, the candidate input information corresponding to the respective candidate stop-nodes are different numerical values which belong to a same measuring dimension and whose probabilities to be input are higher than a predetermined threshold. In the present embodiment, the candidate input information can be the number of months "1", "2", . . . , "12" and "2 years", etc. In other embodiments, the candidate input information can be different according to specific implementation scenes. The ID of the mode switching node 36 can be "other".

At step 304, a control signal corresponding to the slider is received.

The control signal is used for controlling the slider to change a position on the predetermined sliding track. In the present embodiment, the control signal is classified as two kinds. One kind is a sliding signal, i.e., a signal for directly pressing and holding the slider to drag the slider along the predetermined sliding track; and, the other kind is a clicking signal acting on a certain position on the predetermined sliding track.

At step 306, the slider is caused to change a position on the predetermined sliding track according to the control signal.

Since the control signal received by the electronic apparatus can be classified into two kinds, the present step has two different implementations which are specifically as follows:

Firstly, if the control signal is a sliding signal, then the electronic apparatus causes the slider to slide along the predetermined sliding track to change a position according to the sliding signal.

Figure 3C:
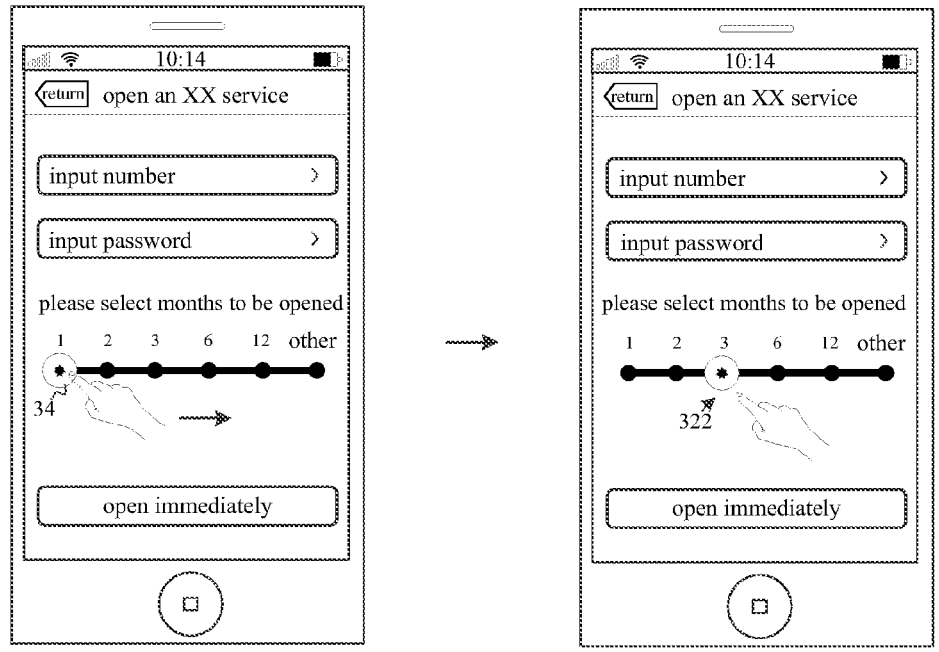

In conjunction with FIG. 3C, when the control signal is the sliding signal, according to the sliding signal, the electronic apparatus causes the slider 34 to slide from an original position along the predetermined sliding track to the third candidate stop-node 322. That is, the changed position of the slider 34 is the third candidate stop-node 322. Obviously, according to the difference of the sliding signal, the slider 34 can slide from side to side at random on the predetermined sliding track.

Secondly, if the control signal is a clicking signal acting on a certain position on the predetermined sliding track, then the electronic apparatus causes the slider to skip to the position from the original position according to the clicking signal.

Figure 3D:
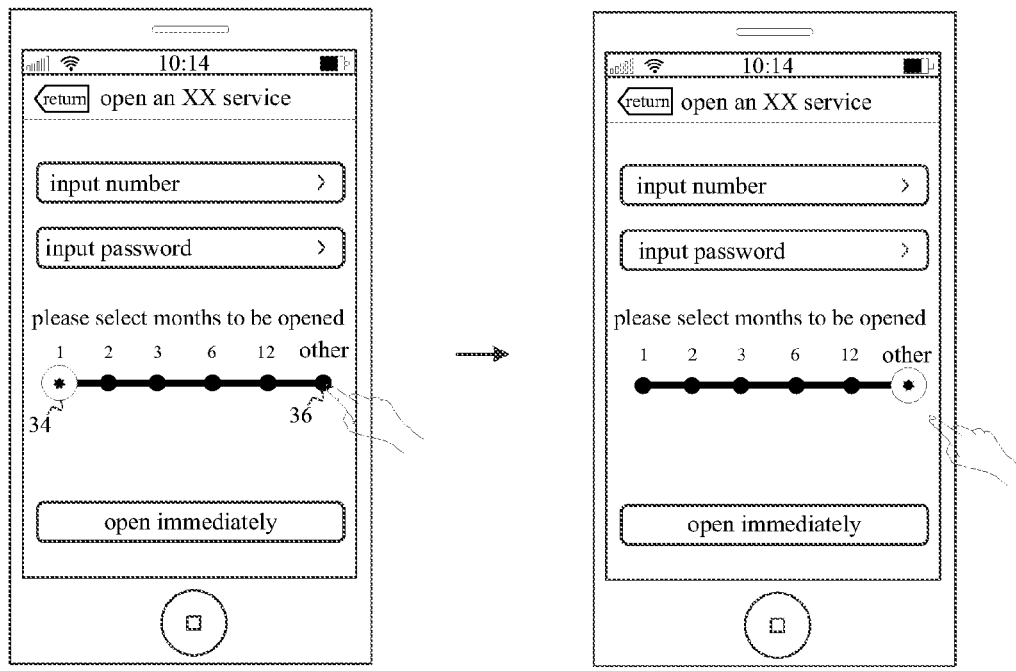

In conjunction with FIG. 3D, when the control signal is the clicking signal, then the electronic apparatus causes the slider 34 to skip directly to the position clicked on by the clicking signal from the original position according to the clicking signal, and the position may be a mode switching node 36. That is the changed position of the slider 34 is the mode switching node 36.

At step 308, when the changed position of the slider is one of the candidate stop-nodes, the candidate input information corresponding to the candidate stop-node where the slider stays is regarded as input information.

When the changed position of the slider is one of the candidate stop-nodes, the electronic apparatus takes the candidate input information corresponding to the candidate stop-node where the slider stays as the input information.

In conjunction with FIG. 3C continually, since the changed position of the slider 34 is the third candidate stop-node 322, at this time, the electronic apparatus takes the candidate input information corresponding to the third candidate stop-node 322, i.e., the number of months "3", as the input information.

Of course, when the slider 34 stays on another candidate stop-node 322, the candidate input information corresponding to the other candidate stop-node 322 can be taken as the input information.

At step 310, when the changed position of the slider is the mode switching node, a self-defined input box is displayed, the self-defined input box is used to receive self-defined input information as the input information.

When the changed position of the slider is the mode switching node, the electronic apparatus displays a self-defined input box, the self-defined input box is used to receive self-defined input information as the input information.

The electronic apparatus can display the self-defined input box in three ways, which are specifically as follows:

Firstly, defining the predetermined sliding track and the slider located on the predetermined sliding track as a first display content, and then the first display content is replaced with a second display content. The second display content includes the mode switching node, the slider staying at the mode switching node and the self-defined input box.

Figure 3E:
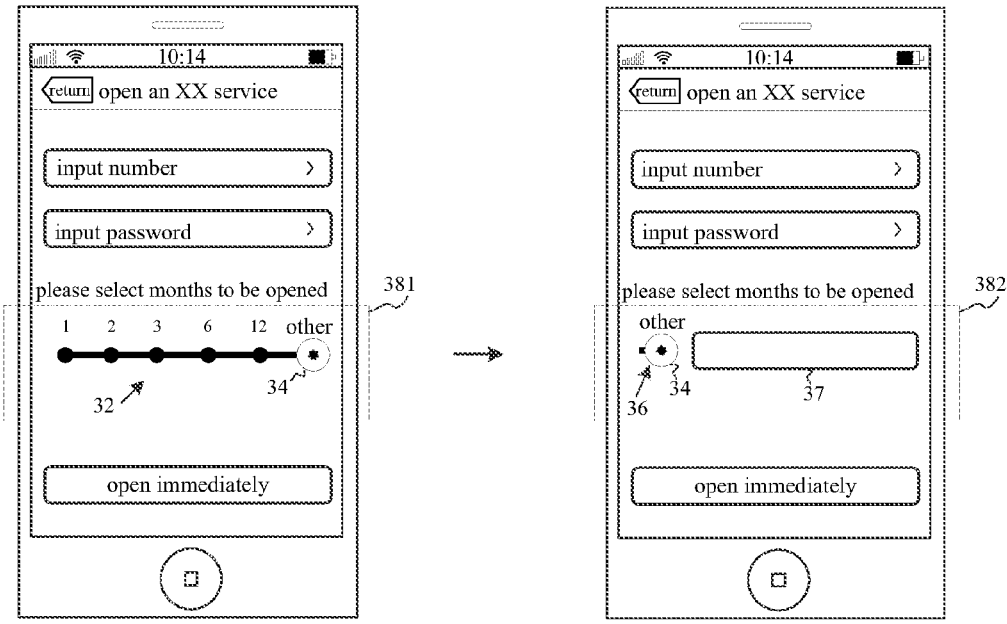

In conjunction with FIG. 3E, when the changed position of the slider 34 is the mode switching node 36, the predetermined sliding track 32 and the slider 34 located on the predetermined sliding track 32 are set as a first display content 381, and then at this time the parts in the predetermined sliding track 32 except the mode switching node 36 will be canceled from displaying, i.e., the electronic apparatus will replace the first display content 381 with a second display content 382. The second display content 382 includes the mode switching node 36, the slider 34 staying at the mode switching node 36 and the self-defined input box 37. The self-defined input box can receive self-defined information input by the user through a tangible keyboard or a virtual keyboard on the electronic apparatus. For example, the self-defined information can be "4 months".

Secondly, defining the predetermined sliding track and the slider located on the predetermined sliding track as a first display content, and then the first display content and the third display content are displayed simultaneously. The third display content includes the self-defined input box.

Figure 3F:
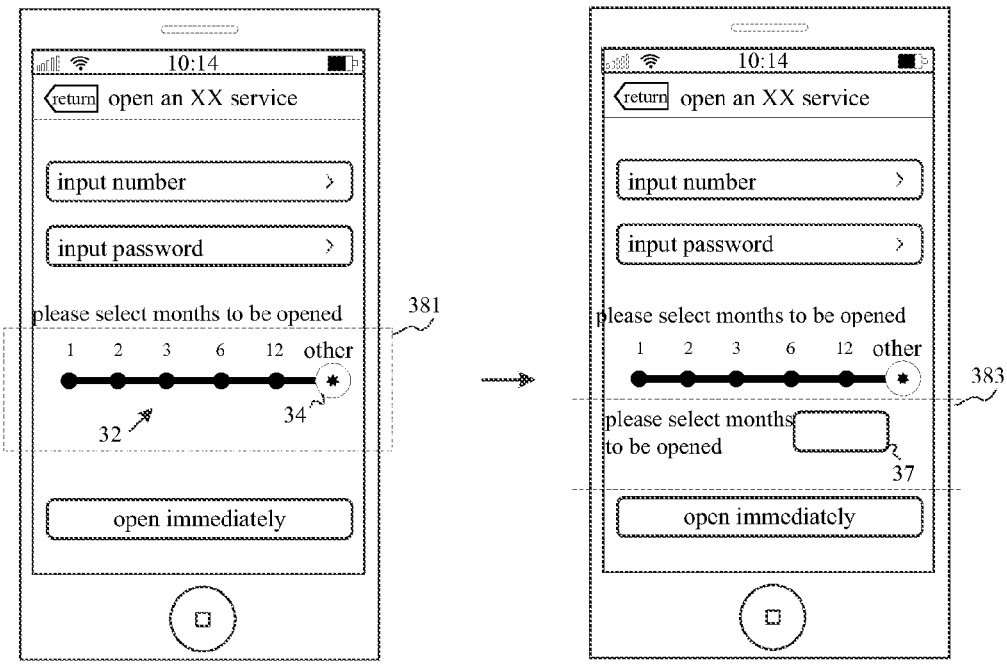

In conjunction with FIG. 3F, when the changed position of the slider 34 is the mode switching node 36, the predetermined sliding track 32 and the slider 34 located on the predetermined sliding track 32 are set as a first display content 381, and then at this time the electronic apparatus can add display of a third display content 383, i.e., the electronic apparatus can display the first display content 381 and the third display content 383 simultaneously. The third display content includes the self-defined input box 37. The self-defined input box 37 can receive self-defined information input by the user through a tangible keyboard or a virtual keyboard on the electronic apparatus. For example, the self-defined information can be "7 months".

Thirdly, defining the predetermined sliding track and the slider located on the predetermined sliding track as a first display content, and then the first display content is replaced with a fourth display content. The fourth display content includes a portion of the track including the mode switching node in the predetermined sliding track, the slider staying on the mode switching node and the self-defined box.

Figure 3G:
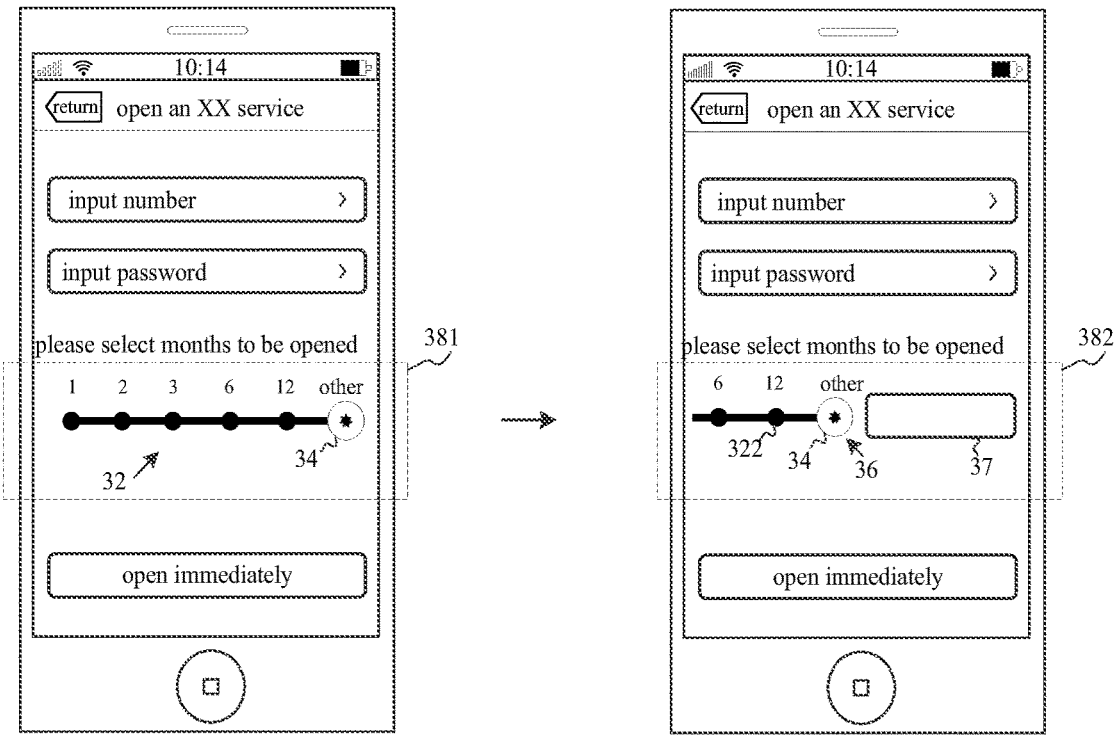

In conjunction with FIG. 3G, when the changed position of the slider 34 is the mode switching node 36, the predetermined sliding track 32 and the slider 34 located on the predetermined sliding track 32 are set as a first display content 381, and then at this time the parts in the predetermined sliding track 32 not including the mode switching node 36 will be canceled from displaying, i.e., the electronic apparatus will replace the first display content 381 with a fourth display content 384. The fourth display content 384 includes a portion of the track including the mode switching node 36 in the predetermined sliding track 32, the slider 34 staying at the mode switching node and the self-defined input box 37. The self-defined input box 37 can receive self-defined information input by the user through a tangible keyboard or a virtual keyboard on the electronic apparatus. For example, the self-defined information can be "9 months".

If the electronic apparatus has received self-defined information input by the user in the self-defined input box 37, then the self-defined information input by the user can be input as information.

For example, the information input method according to the present embodiment further includes step 312 to step 314. At step 312, a switching signal corresponding to the slider is received. The switching signal is used to control the slider to change from the mode switching node to another position of the predetermined sliding track.

After having displayed the self-defined input box, the electronic apparatus can further receive a switching signal corresponding to the slider, the switching signal is used to control the slider to change from the mode switching node to another position of the predetermined sliding track.

For example, in FIG. 3E, FIG. 3F and FIG. 3G, the switching signal can be a signal for dragging the slider 34 to slide to the left.

At step 314, after having received the switching signal, the first display content is displayed again.

After the electronic apparatus has received the switching signal, it displays the first display content again. That is, the electronic apparatus can display the interface similar to that shown in FIG. 3A again (the displaying position of the slider 34 may be a little different).

In summary, by displaying a predetermined sliding track including at least one candidate stop-node and taking the candidate input information corresponding to the candidate stop-node where the slider stays as input information, the information input method provided by the present embodiment solves the problem of relatively low input efficiency in the existing information input method, and achieves the effect of inputting quickly and easily information using the staying position of the slider only by making the slider slide on the predetermined slider track.

In addition, by providing such two input modes as a candidate input mode and a self-defined input mode which can be mixed with each other, the information input method provided by the present embodiment enables to provide a more accurate and more speedy input method in a limited display space, effectively enhances the input efficiency of an electronic apparatus, particularly an electronic apparatus including a touch screen.

It should be noted that, while all the above embodiments illustrate by taking a predetermined sliding track of a straight line as an example, it should be noted that the predetermined sliding track can also adopt other tracks like a sawtooth wave or a curve. By taking the sawtooth wave as an example, each peak valley or peak base of the sawtooth wave can be taken as a candidate stop-node, at which time, more candidate stop-nodes can be provided in a smaller display area.

The following is a device embodiment of the present disclosure. For the particulars that is not detailed therein, refer to the above corresponding method embodiment.

Figure 4:
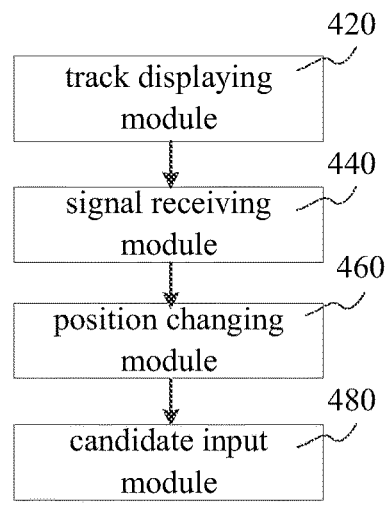
FIG. 4 is a structural block diagram of an information input device provided according to an embodiment of the present invention.

Refer to FIG. 4, which shows a structural block diagram of an information input device provided according to an embodiment of the present invention. The information input device can be implemented as the entirety or a part of an electronic apparatus in hardware, software or the both. The information input device comprises a track displaying module 420, a signal receiving module 440, a position changing module 460 and a candidate input module 480.

The track displaying module 420 is configured to display a predetermined sliding track and a slider located on the predetermined sliding track. The predetermined sliding track includes at least one candidate stop-node, and each candidate stop-node corresponds to a piece of candidate input information.

The signal receiving module 440 is configured to receive a control signal corresponding to the slider displayed by the track displaying module 420.

The position changing module 460 is configured to cause the slider to change a position on the predetermined sliding track according to the control signal received by the signal receiving module 440.

The candidate input module 480 is configured to, when the position changing module 460 causes the changed position of the slider to be one of the candidate stop-nodes, take the candidate input information corresponding to the candidate stop-node where the slider stays as input information.

In summary, by displaying a predetermined sliding track including at least one candidate stop-node and taking the candidate input information corresponding to the candidate stop-node where the slider stays as input information, the information input device provided by the present embodiment solves the problem of relatively low input efficiency in the existing information input method, and achieves the effect of inputting quickly and easily information using the staying position of the slider only by making the slider slide on the predetermined slider track.

Figure 5:
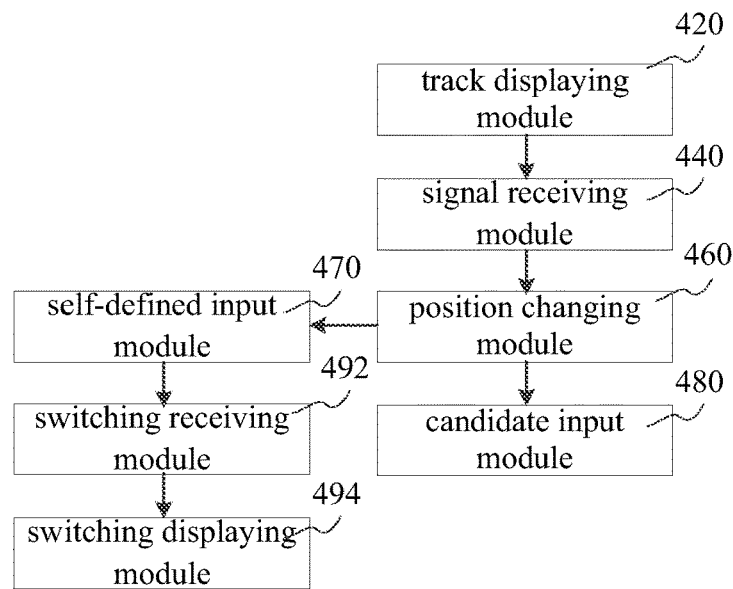
FIG. 5 is a structural block diagram of an information input device provided according to another embodiment of the present invention.

Refer to FIG. 5, which shows a structural schematic diagram of an information input device provided according to another embodiment of the present invention. The information input device can be implemented as the entirety or a part of an electronic apparatus in hardware, software or the both. The information input device comprises a track displaying module 420, a signal receiving module 440, a position changing module 460, a self-defined input module 470, a candidate input module 480.

The track displaying module 420 is configured to display a predetermined sliding track and a slider located on the predetermined sliding track. The predetermined sliding track includes at least one candidate stop-node, and each candidate stop-node corresponds to a piece of candidate input information.

The signal receiving module 440 is configured to receive a control signal corresponding to the slider displayed by the track displaying module 420.

The position changing module 460 is configured to cause the slider to change a position on the predetermined sliding track according to the control signal received by the signal receiving module 440.

The candidate input module 480 is configured to, when the position changing module 460 causes the changed position of the slider to be one of the candidate stop-nodes, take the candidate input information corresponding to the candidate stop-node where the slider stays as input information.

For example, the predetermined sliding track further comprises a mode switching node and the device further comprises the self-defined input module 470.

The self-defined input module 470 is configured to, when the position changing module 460 causes the changed position of the slider to be the mode switching node, display a self-defined input box. The self-defined input box is used to receive self-defined input information.

Specifically, the self-defined input module 470 comprises a first display unit, a second display unit or a third display unit.

Defining the predetermined sliding track and the slider located on the predetermined sliding track as a first display content, and then the first display unit is configured to replace the first display content with a second display content. The second display content includes the mode switching node, the slider staying at the mode switching node and the self-defined input box.

Defining the predetermined sliding track and the slider located on the predetermined sliding track as a first display content and then the second display unit is configured to display the first display content and the third display content simultaneously. The third display content includes the self-defined input box.

Defining the predetermined sliding track and the slider located on the predetermined sliding track as a first display content, and then the third display unit is configured to replace the first display content with a fourth display content. The fourth display content includes a portion of the track including the mode switching node in the predetermined sliding track, the slider staying at the mode switching node and the self-defined input box.

For example, the information input device further includes a switching receiving module 492 and switching displaying module 494. The switching receiving module 492 is configured to receive a switching signal corresponding to the slider, the switching signal is used to control the slider to change from the mode switching node to another position of the predetermined sliding track.

The switching displaying module 494 is configured to, after having received the switching signal, display the first display content again.

For example, the position changing module 460 comprises any one or both of a sliding changing unit and a skipping changing unit.

The sliding changing unit is configured to, if the control signal is a sliding signal, then cause the slider to slide along the predetermined sliding track to change a position according to the sliding signal.

The skipping changing unit is configured to, if the control signal is a clicking signal acting on a certain position on the predetermined sliding track, then cause the slider to skip to the position from an original position according to the clicking signal.

For example, the candidate input information corresponding to the candidate stop-nodes displayed by the track displaying module 420 is different numerical values which belong to a same measuring dimension and whose probabilities to be input are higher than a predetermined threshold.

In summary, by displaying a predetermined sliding track including at least one candidate stop-node and taking the candidate input information corresponding to the candidate stop-node where the slider stays as input information, the information input device provided by the present embodiment solves the problem of relatively low input efficiency in the existing information input method, and achieves the effect of inputting quickly and easily information using the staying position of the slider only by making the slider slide on the predetermined slider track.

In addition, by providing such two input modes as a candidate input mode and a self-defined input mode which can be mixed with each other, the information input device provided by the present embodiment enables to provide a more accurate and more speedy input method in a limited display space, effectively enhances the input efficiency of an electronic apparatus, particularly an electronic apparatus including a touch screen.

It should be indicated that the information input device provided by the above embodiment is described only by taking the division of the above various function modules as an example when inputting information, but in practical applications, the above function division can be completed by different function modules as required, i.e., the internal structure of the apparatus is divided into different function modules, to complete the entirety or a part of the functions described above. In addition, the information input device provided by the above embodiment belongs to a same idea as that of the information input method embodiment, and the device's specific implementation refers to the method embodiment, which will not be repeated here.

Figure 6:
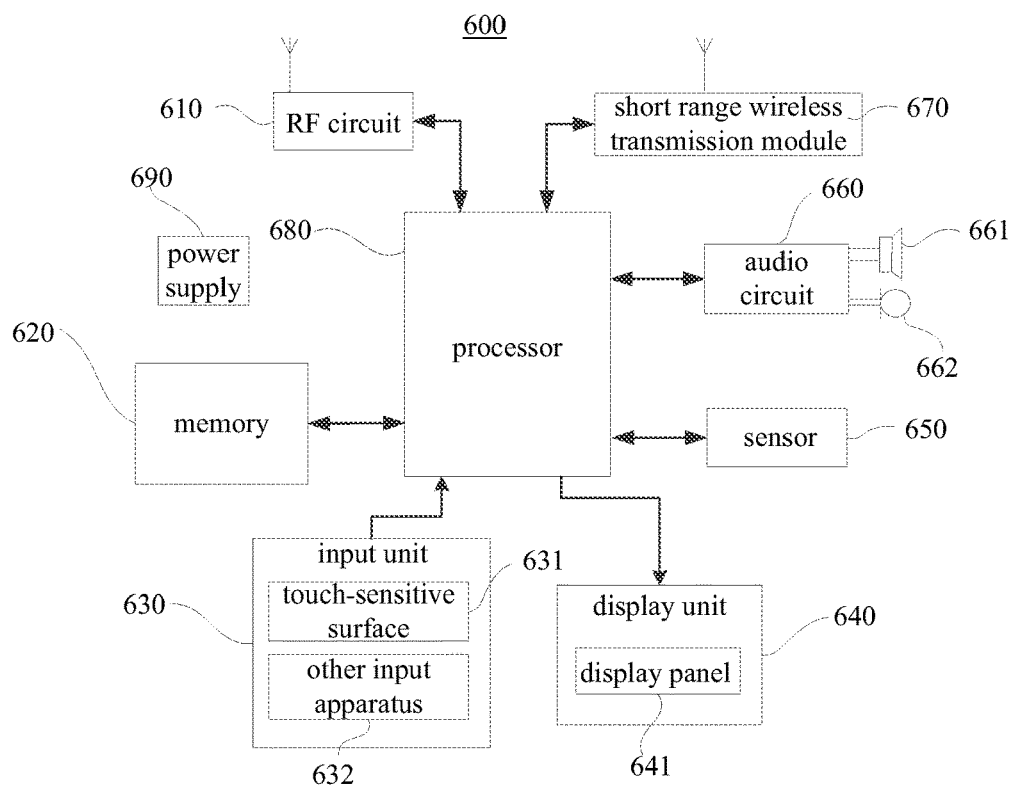
FIG. 6 is a structural block diagram of an electronic apparatus provided according to an embodiment of the present invention.

Refer to FIG. 6, which shows a structural schematic diagram of an electronic apparatus provided according to an embodiment of the present invention. The electronic apparatus is used for implementing the information input method provided in the above embodiment, which is specifically as follows:

The electronic apparatus 600 may include an RF (Radio Frequency) circuit 610, include a memory 620 of one or more computer-readable storage mediums, an input unit 630, a display unit 640, a sensor 650, an audio circuit 660, a short range wireless transmission module 670, a processor 680 comprising one or more processing cores, a power supply 690 and other components. Those skilled in the art will appreciate, the structure of the electronic apparatus shown in FIG. 6 does not constitute a limitation for the electronic device, may include more or fewer components than shown, or may combine some of the components or a different arrangement of components. Where:

The RF circuit 610 may be used for receiving and transmitting signals during the course of receiving and transmitting messages or calling, in particular, after having received the downlink information from the base station, transferring it to one or more processors 680 for processing; and further, transmitting the uplink data to the base station. Typically, RF circuit 610 includes, but is not limited to an antenna, at least one amplifier, a tuner, one or more oscillators, a subscriber identity module (SIM) card, a transceiver, a coupler, an LNA (Low Noise Amplifier), a diplexer and etc. in addition, the RF circuitry 610 may also communicate via wireless communication with the network and other devices. The wireless communication can use any communications standard or protocol, including but not limited to GSM (Global System of Mobile communication), GPRS (General Packet Radio Service), CDMA (Code Division Multiple Access), WCDMA (Wideband Code Division Multiple Access), LTB (Long Term Evolution), e-mail, SMS (Short Messaging Service) and the like.

The memory 620 can be used to store software programs and modules. The processor 680 performs various function applications and data processing by running software programs and modules stored in the memory 620. The memory 620 may mainly include a program storage area and a data storage area, wherein, the program storage area may store an operating system, an application(s) required by at least one function (such as a sound playback function, an image playback function, etc.), etc.; the data storage area may store data created according to the use of the electronic apparatus 600 (such as audio data, a phone book, etc.), etc. In addition, the memory 620 may include a high-speed random access memory and may also include a non-volatile memory, such as at least one disk storage device, a flash memory device, or other volatile solid-state memory devices. Correspondingly, the memory 620 may also include a memory controller to provide access of the processor 680 and the input unit 630 to the memory 620.

The input unit 630 may be used to receive input numeric or character information, and generate signal inputs of a keyboard, a mouse, a joystick or an optical or trackball related to the user setting and the function control. Specifically, the input unit 630 may include a touch sensitive surface 631 and other input devices 632. The touch-sensitive surface 631, also known as a touch screen or a touch pad, can collect the touch operation of the user on or near it (such as the operation of the user on or near the touch-sensitive surface 631 by using any suitable object or attachment such as a finger, stylus, etc.), and drive a corresponding connection device according to a preset program. Alternatively, the touch-sensitive surface 631 may include such two parts as a touch detection device and a touch controller, wherein the touch detection device detects the user's touch orientation, detects a signal brought about by the touch operation and transfers the signal to the touch controller; the touch controller receives touch information from the touch detection device, converts it into contact coordinates, sends it again to the processor 680 and is able to receive and execute commands sent by the processor 680. Further, the touch-sensitive surface 631 can be implemented by using such a plurality of types as resistive, capacitive, infrared and surface acoustic wave. In addition to the touch-sensitive surface 631, the input unit 630 may also include other input apparatuses 632. Specifically, the other input apparatuses 632 may include, but are not limited to one or more of a physical keyboard, function keys (such as volume control keys, switch keys, etc.), a trackball, a mouse, an operating lever and etc.

The display unit 640 may be used to display information input by the user or information provided to the user and various graphical user interfaces of the electronic apparatus 600, and these graphical user interfaces can be formed of graphics, texts, icons, videos, and any combination thereof. The display unit 640 may include a display panel 641, and optionally, the display panel 641 can be configured in the form of an LCD (Liquid Crystal Display), an OLED (Organic Light-Emitting Diode) and etc. Further, the touch-sensitive surface 631 may cover the display panel 641. After the touch sensitive surface 631 detects the touch operation on or near it, it transfers the operation to the processor 680 to determine the type of touch event, then the processor 680 provides a corresponding visual output on the display panel 641 according to type of touch event. Although in FIG. 6 the touch-sensitive surface 631 and the display panel 641 act as two separate components to perform input and output functions, in some embodiments, the touch sensitive surface 631 and the display panel 641 may be integrated to realize input and output functions.

The electronic apparatus 600 may further comprise at least one kind of sensor 650, such as a light sensor, a motion sensor and other sensors. Specifically, the optical sensor may include an ambient light sensor and a proximity sensor, wherein the ambient light sensor can adjust the brightness of the display panel 641 according to light and shade of the ambient light, the proximity sensor may close the display panel 641 and/or a backlight when the electronic apparatus 600 moves to the side of the ears. As one of the movement sensors, a gravity sensor can detect the sizes of accelerations on respective directions (typically three axes), can detect the size and direction of gravity when being stationary, and can be used to identify the applications of mobile phone postures (such as horizontal and vertical screen switching, related games and magnetometer attitude calibration), vibration identification related functions (such as a pedometer, percussion) and the like; as for a gyroscope, a barometer, a hygrometer, a thermometer, an infrared sensor and other sensors that electronic device 600 can be configured by they will not described repeatedly here.

An audio circuit 660, a speaker 661 or a microphone 662 may provide an audio interface between the user and an electronic apparatus 600. The audio circuit 660 can transmits an electrical signal generated by converting the received audio data to the speaker 661, which converts the electrical signal into an acoustic signal to output; on the other hand, the microphone 662 converts the collected acoustic signal into an electrical signal, which is convened into audio data by the audio circuit 660 after it receive the electrical signal, the audio circuit 660 outputs the audio data to the processor 680 which processes it to transmit it to another terminal via the RF circuit 610, or outputs the audio data to the memory 620 for further processing. The audio circuit 660 may also include an earplug jack to provide communications between a peripheral headset and the electronic apparatus 600.

The short-range wireless transmission module 670 may be a WIFI (wireless fidelity) module or a Bluetooth module, etc. The electronic apparatus 600 can help users to send and receive email, browse web pages and access streaming media etc. through short-range wireless transmission module 670. The electronic apparatus 600 provides users with wireless broadband Internet access. Although FIG. 6 shows a short-range wireless transmission module 670, it is understood that it does not belong to an essential constituent of the electronic apparatus 600, and can be omitted completely as required without changing the scope of the essence of the present disclosure.

The processor 680 is the control center of the electronic apparatus 600, connects various parts of the whole electronic apparatus by using a variety of interfaces and connections, and performs a variety of functions and processing data of the electronic apparatus 600 by running or executing a software program and/or module stored in the memory 620 and invoking the data stored in the memory 620, thus conducting the overall control of the electronic apparatus. Alternatively, the processor 680 may include one or more processing cores; for example, the processor 680 may integrate an application processor and a modem processor, wherein the application processor mainly processes an operating system, a user interface and applications, while the modem processor mainly processes wireless communication. It is appreciated that the above modem processor may also be not integrated into the processor 680.

The electronic apparatus 600 further includes a power supply 690 (such as a battery) for supplying each component. For example, the power supply can be logically connected with the processor 680 via a power management system, thus implementing such functions as charging, discharging and power consumption management via the power management system. The power supply 690 may also include any components, such as one or more AC or DC power supplies, recharging systems, power failure detection circuits, power converters or inverters, power status indicators, etc.

Although not shown, the electronic apparatus 600 may further comprises a camera, a Bluetooth module and etc., which will not be described repeatedly here. Specifically, in this embodiment, the display unit of the electronic apparatus 600 is a touch screen display.

The electronic apparatus 600 also includes a memory, and one or more programs, wherein the one or more programs is stored in the memory and configured to be executed by one or more processors. The instructions contained in the above one or more programs are used for executing an information input method, the information input method is the information input method shown by FIG. 2A and the embodiment corresponding to FIG. 2A; and/or the information input method is the information input method shown by FIG. 3A and the embodiment corresponding to FIG. 3A.

As another aspect, another embodiment of the present disclosure further provides a computer-readable storage medium, which can be the computer-readable storage medium contained in the memory in the above embodiment and can also be one individually existing and not fitted into the electronic apparatus or a server. The computer-readable storage medium stores one or more programs, which are used by one or more processors to perform an information input method, the information input method is the information input method shown by FIG. 2A and the embodiment corresponding to FIG. 2A; and/or the information input method is the information input method shown by FIG. 3A and the embodiment corresponding to FIG. 3A.

As a further aspect, another embodiment of the present disclosure provides a graphical user interface used in an electronic apparatus, the electronic apparatus includes a touch screen display, a memory and one or more processors for executing one or more programs, the graphical user interface comprises:

displaying a predetermined sliding track and a slider located on the predetermined sliding track, the predetermined sliding track including at least one candidate stop-node, each candidate stop-node being corresponding to a piece of candidate input information;

receiving a control signal corresponding to the slider;

causing the slider to change a position on the predetermined sliding track according to the control signal; and taking the candidate input information corresponding to the candidate stop-node where the slider stays as input information when the changed position of the slider is one of the candidate stop-nodes.

For example, the predetermined sliding track further comprises a mode switching node, and after causing the slider to change the position on the predetermined sliding track according to the control signal, the method further comprises:

displaying a self-defined input box when the changed position of the slider is the mode switching node, the custom input box being used to receive self-defined input information.

For example, displaying the self-defined input box further comprises:

defining the predetermined sliding track and the slider located on the predetermined sliding track as a first display content and then replacing the first display content with a second display content, the second display content including the mode switching node, the slider staying at the mode switching node and the self-defined input box; or defining the predetermined sliding track and the slider located on the predetermined sliding track as a first display content, and then displaying the first display content and the third display content simultaneously, the third display content including the self-defined input box, or defining the predetermined sliding track and the slider located on the predetermined sliding track as a first display content, and then replacing the first display content with a fourth display content, the fourth display content including a portion of the track including the mode switching node in the predetermined sliding track, the slider staying at the mode switching node and the self-defined input box.

For example, after displaying the self-defined input box, the method further comprises receiving a switching signal corresponding to the slider, the switching signal being used to control the slider to change from the mode switching node to another position of the predetermined sliding track; and after having received the switching signal, displaying the first display content again.

For example, causing the slider to change the position on the predetermined sliding track according to the control signal comprises:

if the control signal is a sliding signal, then causing the slider to slide along the predetermined sliding track to change a position according to the sliding signal; and if the control signal is a clicking signal acting on a certain position on the predetermined sliding track, then causing the slider to skip to the position from an original position according to the clicking signal.

For example, the candidate input information corresponding to the respective candidate stop-nodes is different numerical values which belong to a same measuring dimension and whose probabilities to be input are higher than a predetermined threshold.

The serial numbers of the above embodiments of the present disclosure are only for illustration, and does not represent pros and cons for the embodiments.

Those skilled in the art can understand that the whole or part of the steps to achieve the above-described embodiments can be accomplished by hardware, or can be accomplished by instructing a relevant hardware by a program, the program may be stored in a computer readable storage medium, and the above mentioned storage medium may be a read-only memory, a magnetic or optical disk, etc.

What are described above are only preferred embodiments of the present disclosure, and are not intended to limit the present invention. Any modifications, equivalent replacements or improvements should be included in the protection scope of the present invention.

What is claimed is:

1. An information input method using a graphical user interface, comprises:

displaying a predetermined sliding track and a slider located on the predetermined sliding track, the predetermined sliding track including at least one candidate stop-node and a mode switching node, each candidate stop-node being corresponding to a piece of candidate input information;

receiving a control signal corresponding to the slider;

causing the slider to change a position on the predetermined sliding track according to the control signal;

taking the candidate input information corresponding to the candidate stop-node where the slider stays as input information to a computer program when the changed position of the slider is one of the candidate stop-nodes; and displaying a self-defined input box when the changed position of the slider is the mode switching node, the self-defined input box being used to receive self-defined input information to the computer program, wherein displaying the self-defined input box comprises:

defining the predetermined sliding track and the slider located on the predetermined sliding track as a first display content, and replacing the first display content with a second display content, the second display content including the mode switching node, the slider staying at the mode switching node, and the self-defined input box; or defining the predetermined sliding track and the slider located on the predetermined sliding track as a first display content, and displaying the first display content and the third display content simultaneously, the third display content including the self-defined input box; or defining the predetermined sliding track and the slider located on the predetermined sliding track as a first display content, and replacing the first display content with a fourth display content, the fourth display content including a portion of the predetermined sliding track that includes the mode switching node, the slider staying at the mode switching node and the self-defined input box.

2. The information input method according to claim 1, wherein, after displaying the self-defined input box, the method further comprises:
    receiving a switching signal corresponding to the slider, the switching signal being used to control the slider to change from the mode switching node to another position of the predetermined sliding track; and
    after having received the switching signal, displaying the first display content again.

3. The information input method according to claim 2, wherein, causing the slider to change the position on the predetermined sliding track according to the control signal comprises:
    if the control signal is a sliding signal, then causing the slider to slide along the predetermined sliding track to change a position according to the sliding signal; and
    if the control signal is a clicking signal acting on a certain position on the predetermined sliding track, then causing the slider to skip to the position from an original position according to the clicking signal.

4. The information input method according to claim 1, wherein, the candidate input information corresponding to the respective candidate stop-nodes is different numerical values which belong to a same measuring dimension and whose probabilities to be input are higher than a predetermined threshold.

5. An information input device, comprises:
    a display;
    a memory;
    a processor coupled to the display and the memory;
    the display having a graphical user interface being configured to display a predetermined sliding track and a slider located on the predetermined sliding track, the predetermined sliding track including at least one candidate stop-node, each candidate stop-node being corresponding to a piece of candidate input information;
    the processor being configured to receive a control signal corresponding to the slider;
    cause the slider to change a position on the predetermined sliding track according to the control signal; and
    when the changed position of the slider is one of the candidate stop-nodes, take the candidate input information corresponding to the candidate stop-node where the slider stays as input information to a computer program; and
    the display being configured to display a self-defined input box when the changed position of the slider is the mode switching node, the self-defined input box being used to receive self-defined input information to the computer program, wherein display the self-defined input box comprises:
        define, by the processor, the predetermined sliding track and the slider located on the predetermined sliding track as a first display content, and replace the first display content with a second display content, the second display content including the mode switching node, the slider staying at the mode switching node, and the self-defined input box; or
        define, by the processor, the predetermined sliding track and the slider located on the predetermined sliding track as a first display content, and display the first display content and the third display content simultaneously, the third display content including the self-defined input box; or
        define, by the processor, the predetermined sliding track and the slider located on the predetermined sliding track as a first display content, and replace the first display content with a fourth display content, the fourth display content including a portion of the predetermined sliding track that includes the mode switching node, the slider staying at the mode switching node and the self-defined input box.

6. The information input device according to claim 5, wherein, the processor is further configured to receive a switching signal corresponding to the slider, the switching signal being used to control the slider to change from the mode switching node to another position of the predetermined sliding track; and
    the display is configured to, after having received the switching signal, display the first display content again.

7. The information input device according to claim 6, wherein, the processor is further configured to, if the control signal is a sliding signal, then cause the slider to slide along the predetermined sliding track to change a position according to the sliding signal; and
    configured to, if the control signal is a clicking signal acting on a certain position on the predetermined sliding track, then cause the slider to skip to the position from an original position according to the clicking signal.

8. The information input device according to claim 5, wherein, the candidate input information corresponding to the candidate stop-nodes displayed by the display is different numerical values which belong to a same measuring dimension and whose probabilities to be input are higher than a predetermined threshold.

9. An electronic apparatus, the apparatus comprises an information input device, and the information input device, includes:
    a display;
    a memory;
    a processor coupled to the display and the memory;
    the display having a graphical user interface being configured to display a predetermined sliding track and a slider located on the predetermined sliding track, the predetermined sliding track including at least one candidate stop-node, each candidate stop-node being corresponding to a piece of candidate input information;
    the processor configured to receive a control signal corresponding to the slider;
    cause the slider to change a position on the predetermined sliding track according to the control signal; and
    when the changed position of the slider is one of the candidate stop-nodes, take the candidate input information corresponding to the candidate stop-node where the slider stays as input information to a computer program; and
    the display being configured to display a self-defined input box when the changed position of the slider is the mode switching node, the self-defined input box being used to receive self-defined input information to the computer program, wherein display the self-defined input box comprises:
        define, by the processor, the predetermined sliding track and the slider located on the predetermined sliding track as a first display content, and replace the first display content with a second display content, the second display content including the mode switching node, the slider staying at the mode switching node, and the self-defined input box; or
        define, by the processor, the predetermined sliding track and the slider located on the predetermined sliding track as a first display content, and display the first display content and the third display content simultaneously, the third display content including the self-defined input box; or define, by the processor, the predetermined sliding track and the slider located on the predetermined sliding track as a first display content, and replace the first display content with a fourth display content, the fourth display content including a portion of the predetermined sliding track that includes the mode switching node, the slider staying at the mode switching node and the self-defined input box.

10. The electronic apparatus according to claim 9, wherein, the processor is further configured to receive a switching signal corresponding to the slider, the switching signal being used to control the slider to change from the mode switching node to another position of the predetermined sliding track; and the display is further configured to, after having received the switching signal, display the first display content again.

11. The information input device according to claim 9, wherein, the processor is further configured to, if the control signal is a sliding signal, then cause the slider to slide along the predetermined sliding track to change a position according to the sliding signal; and configured to, if the control signal is a clicking signal acting on a certain position on the predetermined sliding track, then cause the slider to skip to the position from an original position according to the clicking signal.

12. The information input device according to claim 11, wherein, the candidate input information corresponding to the candidate stop-nodes displayed by the display is different numerical values which belong to a same measuring dimension and whose probabilities to be input are higher than a predetermined threshold.

13. The information input method according to claim 1, wherein the predetermined sliding track comprises a straight line, a sawtooth wave, or a curve.

14. The information input device according to claim 5, wherein the predetermined sliding track comprises a straight line, a sawtooth wave, or a curve.

15. The electronic apparatus according to claim 9, wherein the predetermined sliding track comprises a straight line, a sawtooth wave, or a curve.

\* \* \* \* \*